United States Patent [19]

Kennedy, Jr.

[11] 4,353,719
[45] Oct. 12, 1982

[54] DRILLING FLUID GAS AND SOLIDS REMOVAL SYSTEM

[76] Inventor: Alvin B. Kennedy, Jr., P.O. Box 822, Angleton, Tex. 77511

[21] Appl. No.: 223,787

[22] Filed: Jan. 9, 1981

[51] Int. Cl.³ .............................................. B01D 19/00
[52] U.S. Cl. ..................................... 55/170; 55/191; 55/204
[58] Field of Search .......... 55/170, 176, 177, 189–191, 55/199–206, 459 R; 210/512.2

[56] References Cited

U.S. PATENT DOCUMENTS

| | | | |
|---|---|---|---|
| Re. 25,099 | 12/1961 | Hoffmann | 210/512.2 X |
| Re. 27,882 | 1/1974 | Burnham, Sr. | 55/204 X |
| 2,852,091 | 9/1958 | Boudreaux et al. | 55/204 X |
| 2,923,151 | 2/1960 | Engle et al. | 55/204 X |
| 3,201,919 | 8/1965 | Long | 55/204 X |
| 3,241,295 | 3/1966 | Griffin et al. | 55/206 X |
| 3,300,402 | 1/1967 | Grich et al. | 210/512.2 X |
| 4,090,523 | 5/1978 | Kelly, Jr. et al. | 210/512.2 X |
| 4,155,724 | 5/1979 | Burnham, Sr. | 55/204 X |

FOREIGN PATENT DOCUMENTS 18168 10/1980 European Pat. Off. ............. 55/204
58290 10/1967 German Democratic Rep. ... 55/204

Primary Examiner—Robert H. Spitzer
Attorney, Agent, or Firm—Guy E. Matthews

[57] ABSTRACT

Disclosed is a drilling fluid gas and solids removal system. The system includes a pedestal with a solids collection tub rotatably mounted thereon. A pressure vessel is supported by the pedestal above the solids collection tub. The pressure vessel includes a cylindrical degassing neck and a pump is provided to force drilling fluid into the degassing neck in a tangentially spiralling path about the interior of the neck. A plurality of hydrocyclones are connected to the pressure vessel to receive drilling fluid and discharge solids into the solids collection tub. A clean drilling fluid collection tank is mounted about the degassing neck to receive clean drilling fluid from the hydrocyclones.

20 Claims, 5 Drawing Figures

DRILLING FLUID GAS AND SOLIDS REMOVAL SYSTEM

BACKGROUND OF THE INVENTION (A) Field of the Invention

This invention relates to systems for removing gas and drilled solids from drilling fluids, and more particularly, to a modularized system for centrifugally removing gas and drilled solids from the drilling fluid.

(B) Description of the Prior Art

During the drilling of oil and gas wells, the drilling fluid returned from the bore hole is laden with sand and silt, which are collectively referred to as drilled solids. Additionally, in certain situations, the drilling fluid returning from the bore hole may have entrained therein gas from the drilled formations. Also, some gas in the form of air may be introduced into the drilling fluid through leaks in the mud pumps and the like.

Since the presence of drilled solids and gas in the drilling fluid changes the density, viscosity, and other characteristics of the drilling fluid, it is necessary to remove as much as possible of the drilled solids and gas from the drilling fluid prior to its being recirculated in the well bore.

Numerous apparatus have been developed for removing gas from drilling fluid. Conventional degassers typically operate by either attempting to increase the surface area of the drilling fluid stream or by centrifuging the drilling fluid. The surface area increasing degassers typically include means for spraying or propelling the drilling fluid onto plates or baffles. The impingement of the drilling fluid against the baffles causes bubbles of gas to break out of the drilling fluid and the drilling fluid tends to spread over the baffles and thereby increase its surface area. In centrifugal degassers, the drilling fluid is rotated rapidly in a drum or the like and the gas tends to move inwardly toward the center of the drum and out of the drilling fluid. In both the surface spreading and centrifugal degassers, a sub atmospheric pressure is normally created within the degasser to aid in the removal of the gas. Degassers of both types are typically complicated mechanical devices having numerous rotating impellers or drums and vacuum pumps.

Drilled solids are typically removed from drilling fluids either by settling, screening, centrifuging, or a combination thereof. Settling is the least effective method of drilled solids removal and is therefore usually used only in combination with other methods.

Centrifugal drilled solids separation is normally accomplished with a device including a plurality of hydrocyclones. The drilling fluid is introduced tangentially into the hydrocyclone and clean drilling fluid is discharged from the top and drilled solids are discharged from the bottom. However, the efficiency and effectiveness of hydrocyclone drilled solids removal equipment is deminished significantly by the presence entrained gas in the drilling fluid. The presence of entrained gas causes the drilling fluid to become compressible thereby impeding the operation of the hydrocyclone. Additionally, in certain situations a sub atmospheric pressure is created at the bottom of the hydrocyclone, which tends to draw air into the hydrocyclone thereby gasifying the clean drilling fluid.

It is therefore an object of the present invention to provide an improved system for removing gas and drilled solids from drilling fluids.

It is a further object of the present invention to provide a system for removing gas and drilled solids from drilling fluid that is relatively simple and has a minimum of moving parts.

It is a further object of the present invention to provide a system for removing gas and drilled solids from drilling fluid that effectively degasses the drilling fluid prior to removal of the drilled solids and which does not regasify the drilling fluid during drilled solids removal.

SUMMARY OF THE INVENTION

Briefly stated, the foregoing and other objects and advantages of the present invention are accomplished by providing a modular system for removing gas and drilled solids from drilling fluid. The system includes a base having a pedestal mounted thereto. A drilled solids collection tub is rotatably mounted to the pedestal and includes a side wall and a bottom wall that slopes toward a chute in the side wall. A pressure vessel is supported by the pedestal above the drilled solids collection tub and includes a cylindrical degassing neck. A pump, which is mounted on the base, is provided to pump drilling fluid at relatively high pressure into the degassing neck. The drilling fluid is introduced into the degassing neck through a conduit that interconnects the pump and degassing neck. The conduit includes a first portion connected to the pump and a second portion having a rectangular cross section connected tangentially to the degassing neck. The rectangular cross section of the second portion preforms the flow of fluid into the degassing neck to conform to the inside of the degassing neck to flow tangentially and downward through the degassing neck to centrifugally degas the drilling fluid. Also, the high velocity flow through the neck cause the drilling fluid to spread thinly along the wall of the degassing neck, which further aids in removing entrained gas. A plurality of hydrocyclones are connected to receive degassed drilling fluid from the pressure vessel and are arranged to discharge drilled solids into the drilled solids collection tub. A clean drilling fluid collection tank is mounted about the degassing neck and is arranged to receive clean drilling mud discharged from the hydrocyclones. Means are provided for preventing the entry of air into the drilled solids discharge openings of the hydrocyclones and means are provided for venting gas from the degassing neck responsive to the level of drilling fluid in the pressure vessel.

DESCRIPTION OF THE PREFERRED EMBODIMENT

Figure 2:
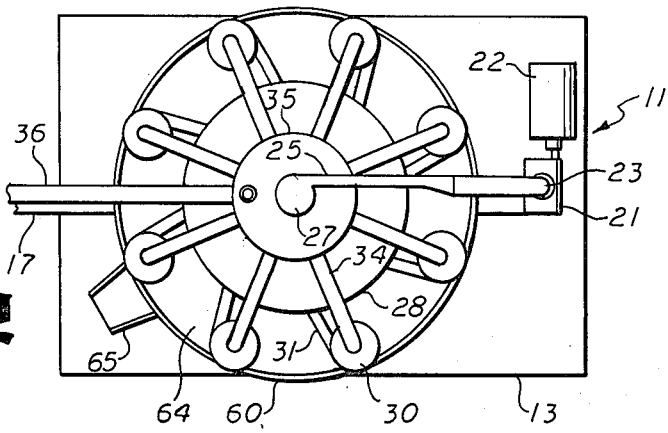
FIG. 2 is a top view of the system of the present invention.
Figure 1:
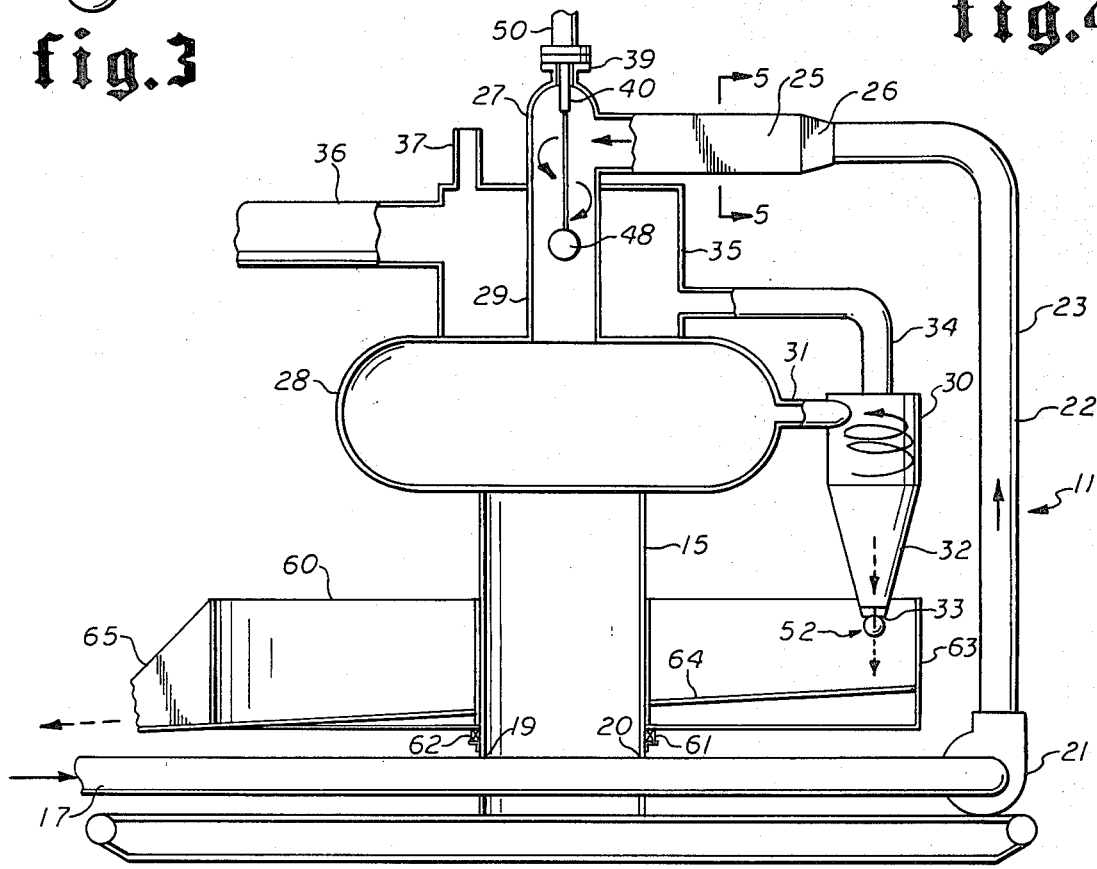
FIG. 1 is a somewhat schematic side partial section view of the preferred embodiment of the system of the present invention.

Referring now to the drawing, and first to FIGS. 1 and 2, the system of the present invention as designated generally by the numeral 11 and includes a skid base 13 which supports a tubular pedestal 15. System 11 is thus portable and readily movable into position to be incorporated into the mud system. It will of course be recognized that system 11 could be mounted in other ways, as for example on a trailer or the like.

Drilling fluid to be cleaned is supplied to system 11 through a conduit 17 which may be connected to the mud return from the well bore or to a settling pit or the like. In the preferred embodiment, conduit 17 is connected to and supported by pedestal 15 through a pair of holes 19 and 20 and pedestal 15.

Conduit 17 is connected to a pump 21 which is mounted to skid 13. In the preferred embodiment, pump 21 is centrifugal in operation and is driven by a suitable skid mounted engine or motor 22. Pump 21 also agitates the drilling fluid, thereby aiding in gas removal. Pump 21 pressurizes the drilling fluid to be cleaned and causes it to flow through a conduit 23.

Conduit 23 includes a generally tubular first portion 24 and a generally rectangular portion 25. Tubular portion 24 and rectangular portion 25 are connected together by a transition portion 26 and in the preferred embodiment, the cross sectional areas of tubular portion 24 and rectangular portion 25 are substantially equal.

As best shown in FIG. 2, rectangular portion 25 is connected tangentially to a degassing neck 27. Degassing neck 27 is part of a pressure vessel 29 having a lower portion 28. Drilling fluid to be cleaned enters degassing neck tangentially from rectangular portion 25 and travels in a helical swirling fashion around and downwardly through degassing neck 27 into lower portion 28. The rectangular cross section of rectangular portion 25 functions to preform the stream of drilling fluid into degassing neck 27. The preformed stream allows the drilling fluid moving through degassing neck 27 to conform more readily to the interior wall of degassing neck 27 causing the drilling fluid to swirl through degassing neck 27 at a higher rate of speed than would be possible if the drilling fluid were introduced through a round conduit. Also, the preformed stream causes the drilling fluid to spread more thinly over the inside wall of degassing neck 27, thus promoting more effective degassification. The swirling flow of drilling fluid through degassing neck 27 subjects the drilling fluid to centrifugal forces that cause substantially all of the entrained gas to be broken free of the drilling fluid.

After having passed through degassing neck 27, the drilling fluid collects in lower portion 28, which is supported by pedestal 15. Supported about the periphery of lower portion 28 are a plurality of hydrocyclones 30, which are connected to lower portion 28 by conduits 31. In the interest of clarity of illustration, only one hydrocyclone 30 is illustrated in FIG. 1, but plural cyclones are illustrated in FIG. 2.

Each hydrocyclone 30 is conventional in nature and each conduit 31 is arranged to inject drilling fluid into hydrocyclone 30 tangentially. The drilling fluid in hydrocyclone 30 spirals downwardly into tapered lowered portion 32 toward an apex 33. Drilled solids travel downwardly with the drilling fluid and tend to migrate toward the inner wall of hydrocyclone 30 due to centrifugal force. At some point in conical portion 32, due to constriction, the clean portion of the drilling fluid reverses direction of rotation and travels upwardly in the central portion of hydrocyclone 30 and into an exhaust conduit 34. The drilled solids continue to spiral downwardly in conical portion 32 toward apex 33.

Figure 4:
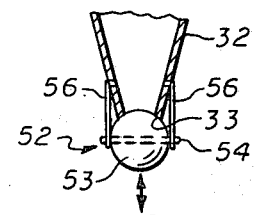
FIG. 4 is a partial section view showing details of the hydrocyclone apex valve of the present invention.

Occasionally during the operation of hydrocyclones, a sub atmospheric pressure will be created at the apex of the hydrocyclone. This sub atmospheric pressure allows air to be sucked upwardly through the hydrocyclone and introduced into the fluid discharge. In the present invention, in order to prevent regasification of the cleaned drilling fluid, apex 33 of hydrocyclone 30 is equipped with a valve 52. As best shown in FIG. 4, valve 52 includes a ball 53 having a pin 54 inserted therethrough. Ball 53 is urged upwardly against apex 33 by a pair of resilient elastic bands 55 and 56. Ball 53 remains normally seated against apex 33 and prevents the inflow of air, but allows drilled solids to exit through apex 33.

The drilled solids discharged from hydrocyclone 30 in the form of sludge and are collected in a circular collection tub 60 which is rotatably mounted about pedestal 15 on suitable bearings 61 and 62. Collection tub 60 includes a cylindrical side wall 63 and a sloping bottom wall 64 which slopes toward a chute 65. The drilled solids discharged from hydrocyclones 30 travel along sloping bottom wall 64 toward chute 65 where they may be collected or disposed of. Those skilled in the art will recognize that the discharge from chute 65 may be passed over a vibratory screen in order to reclaim any drilling fluid discharged with the drilled solids. Further, the drilled solid sludge may be centrifuged to concentrate and reduce the volume of the sludge for better disposal.

The clean drilling fluid discharged from hydrocyclone 30 through conduit 34 is collected in a collection tank 35 which is mounted above lower portion 28 of pressure vessel 29 and around degassing neck 27. The clean drilling fluid flows out of collection tank 35 for reuse through a conduit 36. A vent 37 is provided in collection tank 35 to maintain the atmospheric pressure within tank 35. Those skilled in the art will recognize that the drilling fluid may be processed in multiple hydrocyclone runs if additional cleaning is required.

Figure 3:
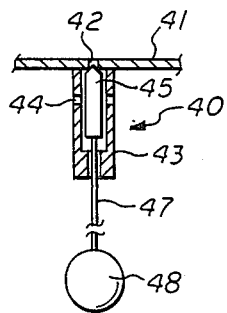
FIG. 3 is a section view showing details of the degassing neck vent valve of the present invention.
Figure 5:
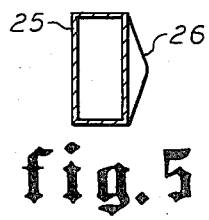
FIG. 5 is a section view taken along line 5—5 of FIG. 1 showing the preforming zone of the conduit of the present invention.

The pressure within pressure vessel 29 is maintained at a preselected level greater than one atmosphere by means of a valve 40, which is connected to the top of degassing neck by a flange 39. As illustrated in FIG. 3, valve 40 includes a flange plate 41 having a seat 42. Connected to and depending from flange 41 is a valve body 43 having a plurality of orifices 44 therein. Axially movably mounted within valve body 43 is a valve element 45 which is adapted to seat against seat 42. Valve element 45 has an outside diameter substantially smaller than the inside diameter of valve body 43, thereby defining an annular cavity into which gas may flow through orifices 44. Valve element 45 is operated to move axially in valve body 43 by an operator rod which extends into valve body 43 through a suitable bushing. Connected to the end of operator rod 47 is a float 48. The length of operator rod 47 is selected to be such that valve 40 normally remains closed due to the level of drilling fluid in pressure vessel 29.

During operation of system 11, the pressure within pressure vessel 29 remains substantially constant, and the level of the drilling fluid is dependent upon the volume of gas within degassing neck 27. As the volume of gas increases, the fluid level within pressure vessel 29 lowers to a point where valve element 45 moves away from seat 42 thereby allowing the venting of gas through valve 40. As the gas is vented, the fluid level within pressure vessel 29 rises to close valve 40. A suitable stack 50 may be connected as by a flange or the like to the top of degassing neck 27 to conduct the vented gas to an appropriate disposal point.

What is claimed is:

1. A system for removing gas and drilled solids from drilling fluid, which comprises:
   a pedestal;
   a pressure vessel supported by said pedestal, said pressure vessel including a cylindrical degassing neck;
   means for maintaining a pressure greater than atmospheric pressure in said pressure vessel;
   a conduit connected tangentially to said degassing neck;
   means for pumping drilling fluid through said conduit to flow tangentially about said degassing neck and into said pressure vessel;
   a plurality of hydrocyclones connected to said pressure vessel to remove drilled solids from said drilling fluid;
   and means for collecting clean drilling fluid discharged from said hydrocyclones.

2. The system as claimed in claim 1, wherein said conduit includes means for preforming the flow of drilling fluid into said degassing neck to conform to the interior of said degassing neck.

3. The system as claimed in claim 2, wherein said preforming means includes a portion of said conduit connected to said degassing neck having a rectangular cross-section.

4. The system as claimed in claim 1, wherein said conduit includes:
   a first portion having a substantially circular cross section connected to said pump;
   a second portion having a substantially rectangualr cross section connected to said degassing neck;
   and means for connecting said first portion to said second portion.

5. The system as claimed in claim 4, wherein the cross sectional area of said first and second portions are substantially equal.

6. The system as claimed in claim 1, including means for venting to the atmosphere gas released from said drilling fluid in said degassing neck.

7. The system as claimed in claim 6, wherein said venting means includes:
   a valve in said degassing neck;
   and means responsive to the level of drilling fluid in said pressure vessel for operating said valve.

8. The system as claimed in claim 7 wherein said operating means includes:
   a float;
   and an operating rod connected between said float and said valve.

9. The system as claimed in claim 1, wherein said clean drilling fluid collecting means includes a collection tank mounted around said degassing neck and connected to said hydrocyclones.

10. The system as claimed in claim 9, including means for maintaining the interior said collection at atmospheric pressure.

11. The system as claimed in claim 1, including means for collecting drilled solids discharged from said hydrocyclones.

12. The system as claimed in claim 11, wherein said drilled solids collecting means includes a collection tub mounted to said pedestal beneath said hydrocyclones.

13. The system as claimed in claim 12, wherein said collection tub includes a side wall with a bottom wall connected thereto.

14. The system as claimed in claim 13, wherein said bottom wall slopes toward a dump chute connected to said side wall.

15. The system as claimed in claim 14, said collection tub is rotatably mounted to said pedestal.

16. The system as claimed in claim 1, including means for preventing the entry of air into the drilled solids discharge openings of said hydrocyclones.

17. The system as claimed in claim 16, wherein said air entry preventing means includes:
   a ball;
   and means for biasing said ball against said opening.

18. The system as claimed in claim 17, wherein said biasing means includes resilient means connected between said ball and said hydrocyclone.

19. The system as claimed in claim 18, wherein said resilient means includes an elastic band.

20. A modular system for removing gas and drilled solids from drilling fluid, which comprises:
   a pedestal;
   a drilled solids collection tub rotatably mounted to said pedestal, said drilled solids collection tub having a side wall and a bottom wall, wherein said bottom wall slopes toward a chute in said side wall;
   a pressure vessel supported by said pedestal above said drilled solids collection tub, said pressure vessel including a cylindrical degassing neck;
   a pump mounted on said base;
   a conduit interconnecting said pump and degassing neck for the flow of drilling fluid to said degassing neck, said conduit including a first portion connected to said pump and a degassing neck for the flow of drilling fluid to said degassing neck, said conduit including a first portion connected to said pump and a second portion having a rectangular cross section connected tangentially to said degassing neck;
   a plurality of hydrocyclones connected to receive drilling fluid from said pressure vessel and arranged to discharge drilled solids into said drilled solids collection tub;
   a clean drilling fluid collection tank mounted about said degassing neck and arranged to receive clean drilling mud discharged from said hydrocyclones;
   means for preventing the entry of air into the drilled solids discharge openings of said hydrocyclones;
   and means for maintaining a pressure greater than atmospheric pressure in said pressure vessel and venting gas from said degassing neck responsive to the level of drilling fluid in said pressure vessel.

* * * * *